Nov. 25, 1969 V. H. SIETMANN 3,479,748
APPARATUS FOR AND PROCESS OF DRYING GRAIN
Filed Sept. 22, 1967 4 Sheets-Sheet 1

INVENTOR
VERNON H. SIETMANN
BY
W. Robert Henderson
ATTORNEY

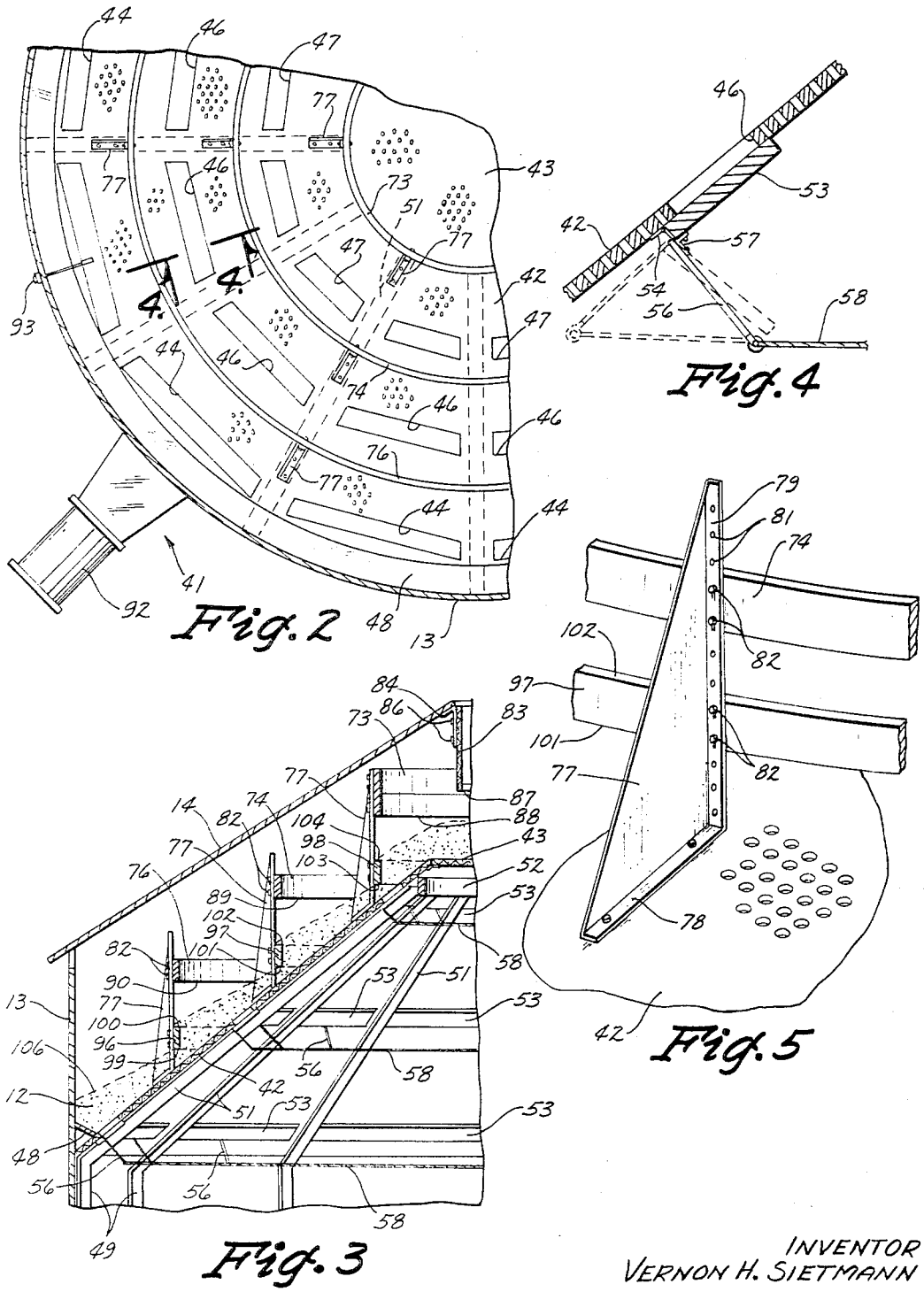

Nov. 25, 1969    V. H. SIETMANN    3,479,748
APPARATUS FOR AND PROCESS OF DRYING GRAIN
Filed Sept. 22, 1967    4 Sheets-Sheet INVENTOR
VERNON H. SIETMANN
BY
L. Robert Henderson
ATTORNEY

INVENTOR
VERNON H. SIETMANN
BY
ATTORNEY

United States Patent Office 3,479,748
Patented Nov. 25, 1969

3,479,748
APPARATUS FOR AND PROCESS OF DRYING GRAIN
Vernon H. Sietmann, Laurel, Iowa, assignor of fifty percent to Gerald F. Dendel, Costa Mesa, Calif., ten percent to Wanda and Raymond Smith, both of Laurel, Iowa, and ten percent to Beth and Larry Keese, both of Gilman, Iowa
Filed Sept. 22, 1967, Ser. No. 669,928
Int. Cl. F26b *17/12, 25/06*
U.S. Cl. 34—33    20 Claims

ABSTRACT OF THE DISCLOSURE

This invention comprises an inverted cone-shaped perforated floor which is mounted in a raised position relative to the base floor of a conventional grain drying bin for batch drying grain within the bin, then dumping the grain to the base floor of the bin. The raised floor has a plurality of particularly placed openings formed therein, closed by a remote operator-controlled device whereby the grain, after drying, can be dumped in an even, level manner onto the base floor. A series of bands are concentrically mounted above the upper floor to maintain the level of the grain being dried parallel to the upper surface of the upper floor for evenness of drying. The bands also serve to make it possible to dry a predetermined amount of grain. The sloped nature of the upper floor permits the grain to tumble gently as it is being dried, without mechanical abuse, thus increasing the efficiency of the drying process.

Background of the invention

This invention relates to the treatment of granular material, and particularly to grain drying bins of contemporary construction, the invention particularly going to the provision within a contemporary grain drying bin of a raised sloped floor structure in the bin for drying a batch; or a portion thereof, of grain after which it is dumped to the bottom of the bin for storage purposes.

There are at the present time several popular methods of drying grain. One method utilizes a grain drying bin, one utilizes a portable batch drier, and another also utilizes a grain drying bin but dries only one batch at a time, the batch then being transferred to another bin for storage purposes.

A disadvantage of the first method is primarily in subjecting several lower levels of grain in the bin to the drying process several times. Also, in introducing the grain to be dried into this type of bin, it must be leveled by mechanical means, and in some instances stirring auger type devices are used to aid aeration of the grain.

The second and third methods require additional equipment and time for handling the grain with respect to moving it from the drying equipment to the storage equipment, all of which increase the drying costs and the possible damage to the grain by over-handling.

Another method of drying grain, not as well known as the former methods, but more close to the present invention is that of batch drying grain within the upper portion of a conventional grain drying bin. The latter method uses a substantially horizontal floor with trap door or gate means formed therein, and with drying air being forced beneath the upper floor, passing therethrough to dry the grain thereabove. After drying, the grain is dumped onto the base floor of the bin for storage purposes. Disadvantages of this method are believed to include an excess of equipment such as a grain leveler mounted above the upper floor for distributing grain in a level manner thereon, and the provision of a sweep auger also directly above the upper floor for aiding in the dumping of the grain after drying through the doors or gates.

Summary of the invention

It is an object of this invention to provide a new and novel apparatus for drying grain.

It is another object of this invention to provide a new and novel apparatus for drying grain which can be added to existing, conventional grain bins with ease and economy.

It is still another object of this invention to provide a grain drying apparatus for use in a conventional grain bin wherein storage space therein is used to the utmost.

It is yet another object of this invention to provide a grain drying apparatus wherein the provision of a moving grain leveling device of any type is eliminated.

It is still another object of this invention to provide a grain drying apparatus wherein the provision of a sweep auger or the like above the drying floor is eliminated.

It is another object of this invention to provide a grain drying apparatus which provides for tumbling the grain as it dries without being contacted by mechanical devices, thereby increasing the drying efficiency and decreasing abuse of the grain by mechanical means.

Another object of this invention is to provide an attachment for a conventional grain drying bin which provides for batch drying therein whereby off-season storage capacity of the bin is increased over that normally had.

Yet another object of this invention is to provide an attachment for a conventional grain drying bin which provides for batch drying therein whereby additional capacity of grain being dried is provided as compared, for example, to a flat, horizontal floor.

Still another object of this invention is to provide an attachment for a conventional grain drying bin whereby the attachment provides a visible indication to the operator when outside the bin for indicating when a predetermined amount of grain for drying has been received therein.

Still another object of this invention is to provide a grain drying apparatus as described hereinbefore which is economical of manufacture, efficient in operation, and easily constructed, installed, and serviced.

It is yet another object of this invention to provide a new and novel process of drying grain.

It is still another object of this invention to provide an improved process for drying grain wherein as the grain dries it tumbles downwardly due to the drying action, said tumbling action increasing the drying efficiency of the process, and obviating the need of mechanical stirring or agitation of the grain.

These objects, and other features and advantages of this invention will become readily apparent upon reference to the following description, when taken in conjunction with the accompanying drawings.

Brief description of the drawings

FIG. 2 is a fragmentary, top plan view of a portion of the grain drying apparatus of this invention, seen from above with a portion of the roof removed;

FIG. 3 is a fragmentary vertical sectional view of the invention, showing a modification thereof;

FIG. 4 is an enlarged sectional view of a trap door for the upper floor taken along the line 4—4 in FIG. 2;

FIG. 5 is a fragmentary, detail view of a portion of the concentric band means of the invention;

Description of the preferred embodiment

Figure 1:
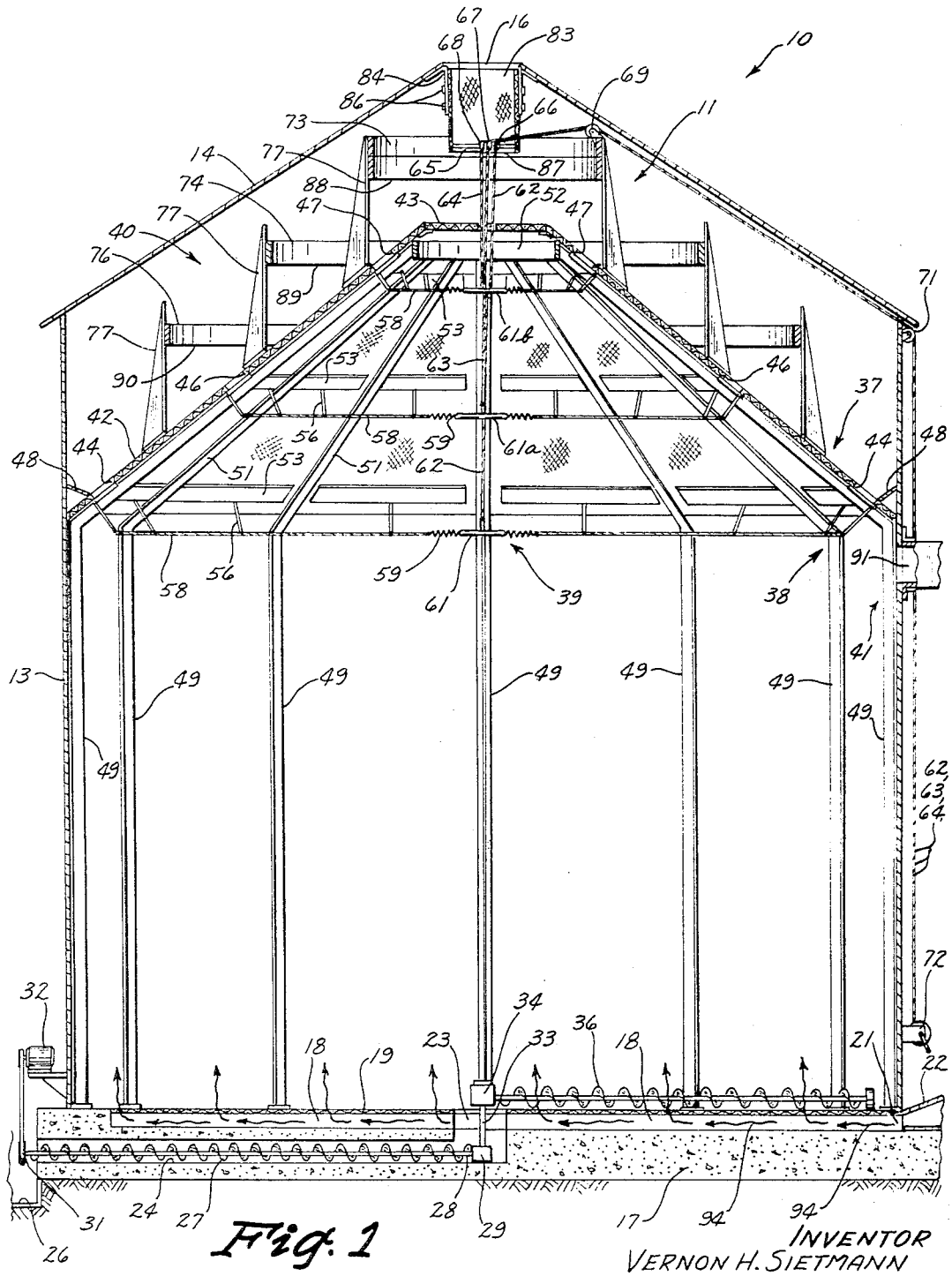
FIG. 1 is a vertical cross-sectional view of the grain drying apparatus of this invention shown in installed and assembled relation with a grain bin.

Referring now to the drawings, and particularly FIG. 1, a conventional grain bin is indicated generally at 10 and houses the grain drying apparatus indicated generally at 11 of this invention, said apparatus 11 capable of drying granular material 12 (FIG. 3) for subsequent storage in the lower part of the bin 10.

The grain bin 10 comprises a side wall 13 and a conically shaped roof 14 mounted thereon. An opening 16 is formed in the apex of the roof 14, and therebelow is found a foundation or base floor 17. The base 17 has an X-shaped trough 18 formed therein, and spaced above the surface of the base 17 is a perforated plate 19 capable of holding granular material while enabling air from therebelow to pass upwardly therethrough.

One leg of the trough 18 fluidly communicates to the exterior of the bin 10 through a passage 21 formed in the side wall 13. A blower system (not shown) is fluidly communicable with the trough 18 through a duct 22, and upon energizing the blower, air is forced into the trough 18 whereupon it percolates upwardly through the perforated floor plate 19 and through granular material stored thereon for aeration purposes.

At the center of the lower floor 19, a sump opening 23 is formed therein which is fluidly communicable with a tunnel 24 formed in the lower floor 19. The tunnel 24 leads from the sump opening 23 to a pit 26 formed in the ground immediately outside the bin 10. An auger 27 is axially mounted in the tunnel 24, with one end 28 thereof secured to a gear housing 29 mounted in the base of the sump opening 23, and with the other end 31 extending into the pit 26. A motor 32 is mounted on the outside of the bin 10 and belt connected to the auger 27 for rotating same.

The gear housing 29 has a vertically disposed shaft 33 rotatably mounted therein and extending upwardly therefrom. Secured to the upper part of the shaft 33 is a second gear housing 34. A sweep auger 36 is rotatably attached to the gear housing 34 and operated thereby. The motor 32 is operable to rotate the auger 27 which in turn causes the sweep auger 36 to rotate about its horizontal axis and to rotate about the shaft 33. The purpose of the auger 27 and the sweep auger 36 will be described more in detail hereinafter.

The drying apparatus 11 of this invention comprises generally an overhead floor structure indicated generally at 37 in FIG. 1, a floor support structure indicated generally at 38, a grain discharge apparatus indicated generally at 39, and a grain leveling control apparatus indicated generally at 40 in FIG. 1. A drying apparatus indicated generally at 41 in FIG. 2 is also utilized with the invention, and of course is necessary for the entire drying process to occur.

The overhead floor structure 37 comprises specifically an inverted, frusto-conical shaped perforated floor of conventional construction, which type of floor is used in this type of grain bin. Referring to FIG. 1, it is seen that the majority of the upper floor 42 slopes downwardly from a relatively horizontal, flat section 43, with the slope of the upper floor 42 being somewhat parallel to the slope of the roof, although this is not critical. The flat section 43 is removable, as compared to a manhole cover such that an operator may, upon removing the section 43, climb down beneath the upper floor 42 for obvious purposes.

Referring to FIGS. 1 and 2, it is seen that the upper floor 42 has a plurality of openings formed therein; an outer set of openings 44, an intermediate set of openings 46, and an inner set of openings 47. It will be noted that all openings are arcuately, equidistantly spaced within each set, and that the respective openings of each of the three sets are also radially spaced relative to the center of the bin. The purpose of this will be described more in detail hereinafter. To prevent grain from becoming trapped between the perimeter of the upper floor 42 and the side wall 13 of the bin 10, a flashing 48 is disposed therebetween, it being noted that the inner edge of the flashing abuts the outer edges of the outer set of openings 44, such that with the inclination of the flashing 48 as illustrated, all grain will eventually fall through the openings 44, when the latter are open.

The floor support structure 38 comprises a plurality of upright posts 49 (FIG. 1) which are mounted about the inner circumference of the bin side wall 13, and at their upper ends of which are formed integrally with sloping rafters 51 which extend up to a junction with an access collar 52 mounted directly below the manhole section 43 of the floor 42. By this arrangement of the floor support structure, it can readily be seen that the floor 42 may be installed in any conventional grain bin of the type illustrated, or similar thereto.

The grain discharge apparatus 39 comprises a trap door 53 (FIG. 4) which is secured by a hinge 54 to the underside of the floor 42 immediately below an opening. The door 53 is connected by a rod 56, secured thereto by a bracket 57, which rod has connected at its outer end a cable 58 which extends horizontally inwardly to a resilient connection by means of a spring 59 with a collar 61. Each of the openings 44, 46 and 47 is provided with the aforementioned door 53 and associated parts, and referring to FIG. 1 it will be noted that all openings on the same level are connected to a single collar 61. The lower collar is connected by a cable 62 to a pulley 66 mounted on a cross-bar 65 at the lower end of a filler sleeve 83 described more in detail hereinafter. The intermediate collar 61a is connected by a cable 63 to another pulley 67 also mounted on the cross-bar 65, and the upper collar 61b is connected by a cable 64 to a pulley 68 also mounted on the cross-bar 65. All of the cables 62, 63, and 64 pass through small openings formed in the floor section 43 for that purpose.

From the pulleys 66–68, the respective cables 62–64 extend to a three gang pulley 69 mounted on a portion of the apparatus 11 described more in detail hereinafter, from whence the cables extend beneath the roof 14 to another gang pulley 71 mounted on the exterior of the side wall 13. The cables then depend to a winch 72 mounted on the lower area of the side wall 13 for manual operation by the operator of the gain bin.

In the normal condition, each trap door 53 is held in a closed position (FIG. 4) relative to the opening with which it is connected as determined by the manipulation of the winch 72. Should it be desirable to open any or all of the openings 44, 46, and 47 whereby grain above may fall through onto the grain bin lower floor 19, the winch 72 is manipulated so as to release either or all cables 62, 63, and 64. The release of any cable will enable the interior cables 58 for any set of openings, in accord with the respective cable released, to move outwardly to a position indicated by dotted lines in FIG. 4, thereby enabling the respective trap doors 53 to hingedly move to a downwardly extended, open condition relative to the respective opening which they were covering. The downward movement of the trap doors 53, and the outward movement of the interior cables 58, plus the releasing movement of the cables 62–64 is brought about due to the weight of the grain on the upper surface of the trap doors 53. Thereby, upon a release by the winch 72 of any particular cable 66–68, an automatic opening of the doors of that particular set of openings 44, 46, or 47 controlled by the particular release cable is automatically effected.

The particular arrangement of the openings relative to each other and relative to their positions over the grain bin lower floor 19 is such as to provide for the grain falling therethrough to fall with its upper surface substantially level, thus obviating the necessity for mechanical means to be provided in the lower interior part of the grain bin for leveling the grain being stored on top of the lower floor 19.

The grain leveling control apparatus 40 comprises a plurality of bands best illustrated in FIG. 1. These bands include an upper band 73, the center of which is the center of the grain bin 10, a middle band 74 disposed concentrically about the upper band 73, and a lower band 76 disposed also concentrically about the upper and middle bands 73 and 74, respectively. Each band is disposed above the upper floor 42 by means of a plurality of arcuately spaced trusses 77 (FIGS. 1 and 5). Each truss 77 includes a base flange 78 which is secured to the floor 42, and an upright flange 79 which has a plurality of holes 81 formed therein through which bolts 82 are used to secure the bands thereto.

The grain leveling control apparatus also includes a filler sleeve 83 mentioned hereinbefore, which sleeve is circular and which is attached by straps 84 and bolts 86 to the underside of the bin roof 14 for axial alignment with the roof opening 16 whereby to receive and guide granular material into the upper area of the grain bin above the drying floor 42. It will be noted that the lower edge 87 of the filler sleeve 83, the lower edge 88 of the upper band 73, the lower edge 89 of the middle band 74, and the lower edge 90 of the lower band 76 are in a common plane substantially parallel to the sloping portion of the upper floor 42. The purpose of this will be seen hereinafter. Furthermore, although not shown the straps 84 are provided with a plurality of vertically spaced openings for the bolts 86 whereby the filler sleeve 83 is vertically adjustable relative to the bands 73, 74 and 76.

Formed in the side wall 13 immediately below the lower edge of the upper floor 42 is an opening 91 (FIG. 1). A blower system 92 (FIG. 2), having a heating unit (not shown) installed therein, is mounted on the side wall 13 and is fluidly communicable with the grain bin below the upper floor 42 through the opening 91. The blower system 92 supplies air to the grain bin below the upper floor 42, which air percolates upwardly through the upper floor 42 and any granular material 13 disposed thereon and exits through the roof opening 16. The heating unit of the system 92 is controlled by a moisture sensing device 93 (FIG. 2) mounted on the side wall 13 extended into the grain bin above the upper floor 42.

Operation of the drying apparatus 11 as illustrated in FIGS. 1, 2, 4 and 5 is as follows. With all trap doors 53 closed, and with the filler sleeve 83 and the bands 73, 74 and 76 so mounted on their respective supports to receive a full batch of grain, the grain is dumped through the sleeve 83 onto the upper roof section 43. The grain then falls downwardly about the floor 42 in all radial directions until it hits the flashing 48, at which time it begins to fill up that rotation of the grain bin 10 above the upper floor 42. The lighter chaff and foreign material mixed with the grain separates from the grain during the falling process, with the heavier grain tending to settle to the bottom of the floor 42.

The filling up process continues until the grain completely fills the area between the lower edge 90 of the lower band 76 and the surface of the floor 42, at which time additional grain can not pass therebetween. The grain then begins to fill the space up between the lower band 76 and the middle band 74 such that when the grain reaches the lower edge 89 of the middle band 74 the grain also has reached the upper edge of the lower band 76. Again, with the area between the lower edge 89 of the middle band 74 and the surface of the floor 42 clogged up, so to speak, additional grain can not pass therebetween and the grain builds upwardly toward the lower edge 88 of the upper band 73 wherein the same process occurs, said process continuing until the space between the lower edge 87 of the filler sleeve 83 and the section 43 of the floor is filled, thereby stopping the flow of grain downwardly through the sleeve.

As stated hereinbefore, the position of the filler sleeve 83 and the bands 73, 74 and 76 are such that when flow of the grain through the sleeve 83 is stopped, a full batch of grain has been dumped into the space of the grain bin above the floor 42. As the edges 87–90 of the sleeve 83 and the bands are substantially aligned with each other and parallel to the slope of the floor 42, it is seen that the upper surface of the grain above the floor 42 is substantially parallel to the surface of the floor itself.

Thus, upon the entry of drying air through the opening 91 formed in the side wall 13 of the bin 10, which air then passes upwardly through the perforated floor 42 for drying the grain held thereabove, an even drying of the grain occurs. The lighter chaff and foreign material suspended above the grain are caught in the rising air current and are exited through the roof opening 16 along with the air. Subsequent to the drying process, and upon the completion thereof, operation of the winch 72 by the operator opening, for example, all trap doors 53 of all openings 44, 46 and 47, provides a dumping of all the grain above the floor 42 onto the lower floor 19 of the grain bin. As stated hereinbefore, the arrangement of the openings 44, 46 and 47 is such that when the grain has fallen onto the floor 19, it assumes a level condition such that means for leveling the grain on the floor 19 are unnecessary. It may be noted at this time, that operation of the blower system 92 for transmitting drying air through the opening 91 is of course controlled by operation of the moisture sensing device 93 as determined by the atmospheric conditions within the grain bin 10 above the upper floor 42. Furthermore, it is entirely conceivable that automatic equipment may be substituted for the manually operated winch 72, such that upon a cessation of the drying cycle for the grain above the upper floor 42, the equipment substituted for the winch 72 is automatically actuated to open the trap doors 53 thereby automatically dumping the grain onto the lower floor 19 for storage purposes.

Upon evacuation of the area above the upper floor 42, an additional batch of grain may be again dumped therein and the drying process repeated.

Aeration for the stored grain is provided by energizing a second blower (not shown) for forcing cool air through the duct 22 (FIG. 1), as indicated by the arrows 94. The cool air, as it passes upwardly through the stored grain will absorb heat therefrom and carry it upwardly. Advantageously, the cool air, now heated, passes through the perforated upper floor 42 and augments the heated air supplied by the blower system 92.

To evacuate the grain from the lower floor 19, the sweep auger 36 is operated to move the grain into the sump opening 23, then the outer motor 32 is energized and the grain is carried outwardly of the grain bin 10 through the tunnel 24 and into the pit 26.

The drying process as to the second batch of granular material in the grain bin above the upper floor 42 is again repeated in the same manner as described hereinbefore, with said process being repeated over and over again until, and unless of course, the storage area below the floor 42 is completely filled without removal of the stored grain.

Referring now to FIG. 3, a modification of the invention is illustrated wherein a plurality of additional bands 96, 97, and 98 are illustrated, one of said bands also being illustrated in FIG. 5, and with said bands providing for utilization of the area above the upper floor 42 for a portion of a batch, as compared to the full batch apparatus as provided by the structure specifically shown in FIG. 1.

It is seen from the illustration of the level 106 of granular material above the floor 42, that the grain after striking the flashing 48 as described hereinbefore, goes to the lower edge 99 of the band 96, and from the upper edge 100 of the band 96 to the lower edge 101 of the band 97, thence from the upper edge 102 of the band 97 to the lower edge 103 of the band 98, and thence from the upper edge 104 of the band 98 toward the lower edge of the filler sleeve 83. By means of the holes 81 in the upright flange 79 (FIG. 5) of the trusses 77, not only can the upper bands 73, 74 and 76 of all trusses be vertically adjusted thereon, but the additional lower bands 96, 97 and 98 are adjustable such that any particular amount of grain which is desirable to be dried at one time above the floor 42 can be so handled by this apparatus. It should be noted that the upper band 73 may be made higher with a concurrent raising of the lower edge of the filler sleeve 83 whereby the amount of grain placed initially in the band 73 area for each drying operation will be sufficient to accomodate normal shrinkage of grain to maintain the grain surface substantially level or parallel to the surface of the floor 42. The drying cycle, dumping process, and storage or removal process is the same as with the modification as illustrated in FIG. 3, as are all cycles of operation relative to the first described embodiment.

It is seen that the process of drying grain which is provided by the apparatus 11 as described hereinbefore, and by any other apparatus the equivalent thereof, comprises the following steps: holding the grain to be dried above a supporting surface such as the upper floor 42; passing air from below the supporting surface 42 upwardly through the grain, the air passable through the surface 42 by means of its being perforated, and providing for the grain to tumble downwardly at an angle relative to the vertical due to its own drying action, while maintaining it still above the supporting surface or floor 42. To elaborate on the cause of tumbling, as the grain dries, it shrinks in size; furthermore as the wetness factor is reduced, less cohesion is had between the kernels—the overall result being a decreasing resistance to gravity and thus a combined shrinkage and falling resulting in the tumbling action. This process is to be compared to the normal process wherein grain is held on a horizontal surface such that when the drying air is passing upwardly therethrough, as compared to the grain tumbling downwardly and sidewardly, or on an angle relative to the vertical, the grain merely settles straight downwardly in a vertical axis due to its being dried.

Such angular, downwardly tumbling action of each kernel of grain separates said kernel from the adjacent kernels, tumbling it over such as to provide not only the separation but a change of position of all kernels, thereby aiding and increasing the efficiency of the drying process.

The drying process is added to by the improved dumping process, used in combination therewith, wherein after the drying process is completed, the dried grain is dumped by the particularly placed openings 44, 46 and 47 such that when fully settled onto the bottom or lower floor 19 of the grain bin 10, the upper surface of the "dumped" grain is substantially level. As mentioned hereinbefore, this obviates the need for leveling equipment in the lower part of the bin 10.

Figures 6, 7, 8:
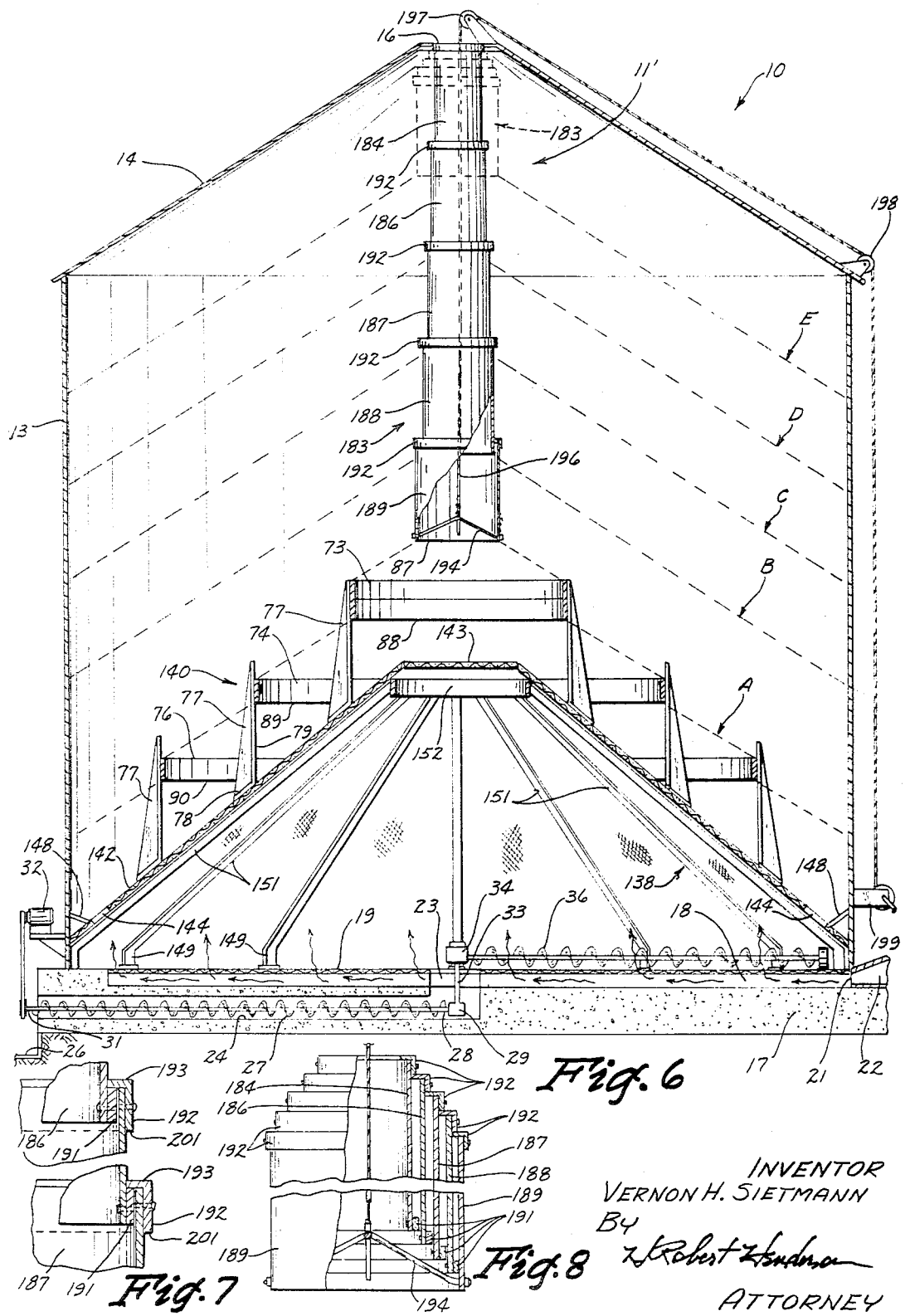
FIG. 6 is a vertical cross-sectional view of a modification of the apparatus of FIG. 1.
FIG. 7 is an enlarged sectional view of a detail of FIG. 6.
FIG. 8 is an enlarged view, partially in section, of a detail of FIG. 6, showing the filler sleeve completely telescoped together.

Referring to FIGS. 6 through 8 inclusive, a modified grain drying apparatus is indicated generally at 11', said apparatus 11' being mounted in the conventional grain bin 10 which is identical to the bin 10 of the FIG. 1 embodiment. The drying apparatus 41 of the FIG. 1 embodiment is, however, eliminated from the modified drying apparatus 11', with all drying and cooling air entering the bin 10 through the duct 22 and passage 21 (FIG. 6) for drying purposes. All other elements of the grain bin 10 of FIG. 6 which are identical to the elements of the FIG. 1 embodiment are identified by like numerals. Certain structure of the apparatus 11' which is identical to the structure of the apparatus 11 of FIG. 1 is also identified by like numerals.

The drying apparatus 11' of this embodiment comprises generally a raised floor structure indicated generally at 137 in FIG. 6, a floor support structure indicated generally at 138, and a grain leveling control apparatus indicated generally at 140.

The raised floor structure 137 comprises specifically an inverted, frusto-conical shaped perforated floor of conventional construction, which type of floor is used in this type of grain bin. Like the FIG. 1 floor 42, and the floor 19, the instant floor 142 is of the type which will not let granular material pass therethrough from the top surface to the bottom surface, but does pass air upwardly therethrough from the bottom surface to the top surface.

The raised floor 142 slopes downwardly from a relatively horizontal, flat section 143 at the center of the floor, with the slope of the raised floor 142 again being somewhat parallel to the slope of the roof 14, although this is not critical. The flat section 143 is removable, as compared to a manhole cover such that an operator may, upon removing the section 143 climb through that portion of the floor 142.

To pass grain through the floor 142 from thereabove to the area of the grain bin 10 below, a plurality of arcuately spaced openings 144 are formed about the periphery of the floor 142. To prevent grain from becoming trapped between the perimeter of the floor 142 and the sidewall 13 of the bin 10, a flashing 148 is disposed therebetween, it being noted that the inner edge of the flashing 148 abuts the outer edges of the openings 144, such that with the inclination of the flashing 148 as illustrated, all grain will eventually fall through the openings 144. It should be noted that the proximity of the raised floor 142, and particularly the openings 144, to the surface of the base floor 19 of the bin 10 is such that upon wet grain being placed upon the raised floor 142, but a certain amount will fall through the constantly open openings 144 to the extent that they will clog up, whereby the granular material will then build on the surface of the raised floor 142 and thereabove in the exact same manner as described hereinbefore with respect to the embodiment of FIG. 1.

The floor support structure 138 comprises a plurality of upright posts 149 (FIG. 6) which are mounted about the inner circumference of the bin sidewall 13, and their upper ends of which are formed integrally with sloping rafters 151 which extend up to a junction with an access collar 152 mounted directly below the manhole section 143 of the floor 142. Again by this arrangement of the floor support structure 138, it can readily be seen that the floor 142 may be installed in any conventional grain bin of the type illustrated, or similar thereto.

The grain leveling control apparatus 140 comprises a plurality of bands which are identical, as indicated by like reference numerals, to the bands and support structure therefor of the FIG. 1 embodiment. The grain leveling control apparatus 140 also includes a filler sleeve unit 183 which comprises a plurality of tubular sleeves; specifically an upper stationary sleeve 184 which is secured at its upper end to the roof 14 so as to surround the opening 16, with four additional sleeves 186, 187, 188, and 189 being provided, each lower sleeve being of a slightly larger diameter than the next upper sleeve as is the nature of a telescopic arrangement such as this illustrated.

At the base of each sleeve (see FIG. 7) a collar 191 is secured about the base; and at the upper end of each sleeve, with the exception of the upper sleeve 184, a right angular flange 192 is secured thereto, said flange 192 having a horizontally disposed, inwardly extended leg 193.

As best illustrated in FIG. 7, when the sleeves of the filler unit 183 are completely extended (see FIG. 6), the base collar 191 of each sleeve supports the sleeve therebelow by means of engaging the undersurface of the horizontal leg 193 of the flange 192 secured to the sleeve therebelow.

To raise the entire filler sleeve unit 183, for a purpose described hereinafter, such that the entire unit is disposed as illustrated in FIG. 8, and as illustrated by dotted lines in FIG. 6, a plurality of support braces 194 are provided at the bottom end of the lower sleeve 189, which braces are secured to a cable 196. The cable 196 is trained about a pulley 197 mounted on the roof 14 of the bin 10 adjacent the opening 16, with the cable also being trained about a side pulley 198 from whence it depends to a winch 199 mounted on a side 13 of the bin adjacent the ground for manipulation by the operator. Upon a raising of the cable 196, as the lower sleeve 189 is moved upwardly about so as to embrace the next adjacent sleeve 188, the upper surface of the leg 193 (FIG. 7) engages the lower end 201 of the flange 192, thereby picking up the sleeve 188 and moving it toward the next upper sleeve 187 whereby the same process is repeated until all sleeves are telescoped together as best illustrated in FIG. 8.

Operation of the embodiment apparatus 11' of FIGS. 6–8 is as follows. With the sleeves 184–189 completely expanded as illustrated in full lines in FIG. 6, grain is dumped through the opening 16, downwardly through the sleeves and onto the raised floor 142. The grain then runs downwardly about the floor 142 in all radial directions, hitting the flashing 148 and thereby beginning to build up, with a portion passing through the openings 144. As explained hereinbefore, as the grain is wet, these openings 144 will quickly clog up due to the grain building up therebelow.

The filling process continues until the grain completely fills the area below the lower edge 90 of the lower band 76 and the surface of the floor 142, which area on the basis of a line normal to the surface of the floor 142 is approximately two feet. When this area is filled, additional grain can no longer pass therebetween, whereupon the grain builds up to fill the space between the upper edge of the lower band 76 and the lower edge 89 of the middle band 74. The process repeats itself until the area between the floor 142 and the lower edge 88 of the upper band 73 is filled, whereupon the grain then builds upwardly within the upper band 73 until it reaches the lower edge 87 of the lowest filler sleeve 189. A level of grain indicated generally by A in FIG. 6 is thereby created. At this time, drying air is transmitted through the duct 22, the passage 21 and the trough 18 beneath the floor 19, which drying air passes upwardly through the floor 19 into the chamber formed below the perforated floor 142. The air continues to rise through the perforated floor 142, thereby effecting a drying process on the grain above the floor 142 in a like manner to conventional drying of grain on a level floor. Due to the level of the grain above the floor 142 being substantially parallel to the level of the floor 142, an even and efficient drying of the grain is obtained.

As the first batch is dried, should it be desirable to withdrawn the batch from above the floor 142, the sweep auger 36 and the discharge auger 27 are both operated. By rotation of the sweep auger 36, due to the openings 144 being continually open, as grain is removed therebelow, the grain above the openings 144 and the floor 142 will continue to fall through the openings 144 and be removed from the bin 10 by the sweep auger 36 until all grain which has been dried is removed.

Conversely, should it be desirable to continue the drying process, rather than withdrawing the first batch of dried grain, the winch 199 is operated to raise the sleeve 189 until it embraces the next adjacent upper sleeve 188. As the length of all sleeves 184–189 is substantially identical, this movement places the lower edge 87 of the sleeve 189 at approximately the same distance, two feet for example, above the surface A of the first batch as it was spaced above the apex of the floor 142 for the drying of the first batch. The second batch B is then dumped through the sleeve unit 183 with its surface assuming a surface substantially parallel to the sloped surface of bath A as indicated by dotted lines in FIG. 6, this ensuring again a substantially equal level of grain over the surface of the dried grain for evenness of drying.

The drying process is again repeated for the batch B of grain, and it can readily be seen that batches C, D and E may be dried prior to any of the batches A–E being removed. When all batches A–E are dried, operation of the sweep auger 36 will quickly remove the grain in the manner described hereinbefore. When the grain is completely removed from the bin 10, operation of the winch 199 may effect a complete lowering of the sleeve unit 183 such that sleeves are again in the full line position illustrated in FIG. 6.

Figure 9:
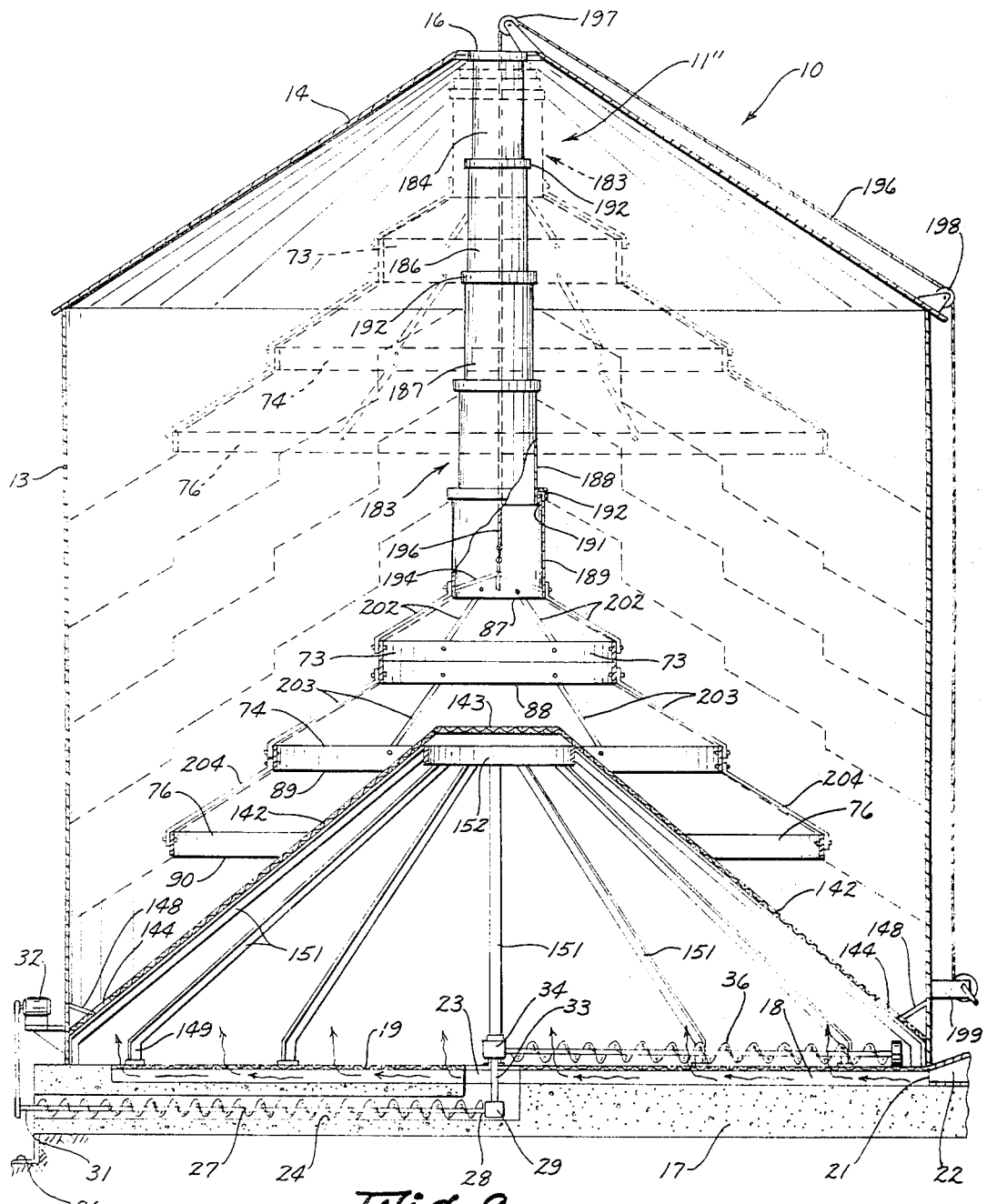
FIG. 9 is a vertical cross-sectional view of a third modification of the apparatus of FIG. 1.

Referring to FIG. 9, a third embodiment is illustrated, the apparatus being indicated generally at 11'. This apparatus is substantially identical to the embodiment shown in FIGS. 6–8, with like parts being indicated by like reference numerals, with the exception that the bands 73, 74 and 76 are no longer mounted on and supported to the floor 142 by means of the trusses 77 and associated parts, but are secured as a unit to the lower sleeve 189 of the sleeve unit 183.

As illustrtaed in FIG. 9, the relationship of the bands 73, 74 and 76 to each other, to the lower edge 87 of the sleeve 189, and to the surface of the floor 142 is identical to the arrangement of FIG. 6, and also to the arrangement of FIG. 1; however, the upper band 73 is secured by a plurality of radially extended, downwardly disposed straps 202 to the base of the sleeve 189, the bands 73 and 74 are interconnected by another plurality of straps 203, and the bands 74 and 76 are interconnected by a third set of straps 204.

By this arrangement, the operation of the apparatus 11'' as to the first batch of grain placed in the bin 10 for drying is identical to the apparatus 11' of FIG. 6. However, it can readily be seen that upon a raising the sleeve 189 to embrace the sleeve 188, for example, the bands 73, 74 and 76 also raise. This arrangement ensures that the surface of the second, third, etc. batches of grain to be dried is substantially parallel to the surface of the raised floor 142 at all times such that evenness of drying and the tumbling action of the grain, which action is the same as the FIG. 6 and the FIG. 1 embodiments, are obtained.

It should be noted as to all of the embodiments of FIGS. 1, 6 and 9 that a definite visible indication of the entry of a certain amount of grain into the bin 10 is provided by each arrangement. It is to be remembered that when the grain has reached the lower edge 87 of the filler sleeve, which edge 87 is the lowest part of said sleeve, the grain will then build up within the sleeve until it reaches the opening 16 on the roof line 14. At this point, continued filling of grain would result in the grain spilling out of the opening 16 and onto the roof 14, which spilling would be quite obvious to the naked eye. By this arrangement, the operator need not necessarily concern himself with an exact amount of grain to be elevated and placed into the bin, but could operate the grain filling structure until he merely saw grain beginning to spill out of the opening 16, at which time he would know of certainty that the proper amount of grain had been inserted into the bin 10.

Although several modifications of this invention have been described and disclosed hereinbefore, it is to be remembered that various other modifications and alternate constructions can be made relative thereto without departing from the true spirit and scope of the invention as defined in the appended claims.

I claim:

1. Apparatus for drying granular material in a grain bin having an enclosure forming wall, a roof mounted over the wall, and a base floor for the wall, the apparatus comprising:

a floor mounted in the upper part of the bin, said floor perforated whereby it is capable of holding granular material on its upper surface while passing air through to the upper surface from below its bottom surface, said floor being inclined and sloping downwardly from the center of the bin toward and in contacting relation with the wall whereby grain disposed on said floor is prevented from falling onto said base floor, said floor having a plurality of openings formed therein through which the granular material can fall;

closure means operably connected to said floor for closing said openings, and means for supplying drying air within the bin and below said floor.

2. Apparatus as defined in claim 1, and wherein said openings are arcuately equidistantly spaced.

3. Apparatus as defined in claim 1, and wherein said closure means includes a trap door at each opening normally held closed over said each opening, and capable of being hingedly opened by the weight of the grain thereabove, said closure means also including a system of cables and pulleys interconnecting all doors whereby selected doors can be opened by the operator at a predetermined times.

4. Apparatus as defined in claim 1, and wherein circular means are mounted on said floor, extending around the bin above said floor and capable of holding the granular material at substantially a constant level over said floor.

5. Apparatus as defined in claim 4, and further wherein said circular means comprises a plurality of horizontally disposed band members mounted above said floor at equal distances, said band members disposed in a plurality of concentrically arranged rings about the center of the bin.

6. Apparatus as defined in claim 5, and further wherein each concentric ring comprises at least a pair of band members disposed in a common vertical plane in cross section, the vertical spacing of each pair of band members in each concentric ring above said floor being identical.

7. Apparatus as defined in claim 6, and wherein at least one band member in each concentric ring is vertically adjustable.

8. Apparatus as defined in claim 5, and wherein the lower edges of said band members lie in a common plane extending parallel to the upper surface of said floor.

9. Apparatus as defined in claim 8, and wherein with the bin roof having a central opening formed therein, a tubular sleeve is mounted in said opening for directing granular material from external the bin into the bin above said floor, said sleeve vertically adjustable so as to determine the quantity of granular material held by said floor.

10. Apparatus for drying granular material in a grain bin having an enclosure forming wall, a roof mounted over the wall, and a base floor for the wall, the apparatus comprising:

a floor mounted in the upper part of the bin, said floor perforated whereby it is capable of holding granular material on its upper surface while passing air through to the upper surface from below its bottom surface, said floor having an inverted cone-shape in full cross-section, sloping downwardly from the center of the bin toward and in contacting relation with the wall whereby grain disposed on said floor is prevented from falling onto said base floor, said floor having a plurality of openings formed therein through which the granular material can fall;

circular means mounted on said floor, extending around the bin above said floor and capable of holding the granular material on said floor at substantially a constant level over said floor;

tubular sleeve means secured to the roof and embracing an opening formed therein for directing granular material from external the bin into the bin above said floor, said sleeve means having a discharge opening at its lower end defined by an edge, which edge is vertically adjustable relative to said circular means; and means for transmitting drying air within the bin and below said floor.

11. Apparatus as defined in claim 10, and wherein said circular means comprises a plurality of horizontally disposed band members mounted above said floor at equal distances, said band members disposed concentrically about the center of the bin.

12. Apparatus as defined in claim 11, and wherein the lower edges of said band members lie in a common plane extending substantially parallel to the upper surface of said floor.

13. Apparatus for drying granular material in a grain bin having an enclosure forming wall, a roof mounted over the wall, and a base floor for the wall, the apparatus comprising:

a floor mounted in the upper part of the bin, said floor perforated whereby it is capable of holding granular material on its upper surface while passing air through to the upper surface from below its bottom surface, said floor having an inverted cone-shape in full cross-section, sloping downwardly from the center of the bin toward and in contacting relation with the wall whereby grain disposed on said floor is prevented from falling onto said base floor, said floor having a plurality of openings formed therein through which the granular material can fall;

tubular sleeve means secured to the roof and embracing an opening formed therein for directing granular material from external the bin into the bin above said floor, said sleeve means having a discharge opening at its lower end defined by an edge, which edge is vertically adjustable relative to said circular means;

circular means connected to said tubular means and movable in response to movement of said lower end, said circular means extending around the bin above said floor for holding the granular material on said floor at substantially a constant level thereabove; and means for transmitting drying air within the bin and below said floor.

14. Apparatus as defined in claim 13, and wherein said circular means comprises a plurality of horizontally disposed band members mounted above said floor and disposed in a plurality of concentrically arranged rings about the center of the bin, the lower edges of said band members being disposed in a common plane extending parallel to the upper surface of said floor.

15. Apparatus for drying granular material in a grain bin having an enclosure forming wall, a roof mounted over the wall with a center opening formed therein, and a base floor for the wall, the apparatus comprising:

a floor mounted in the upper part of the bin, said floor perforated for holding granular material on its upper surface while passing air through the upper surface from below said floor, said floor having an inverted cone-shape in cross section, sloping downwardly from the center of the bin toward and in contacting relation with the wall whereby grain disposed on said floor is prevented from falling onto the base floor, said floor having a plurality of openings formed therein through which the granular material can fall;

closure means operably connected to said floor for closing said openings, said closure means including means disposed on the bin adjacent the base floor thereof for remote control of the closure means by the bin operator;

filler sleeve means secured to the roof and embracing the opening formed therein for directing granular material from external the bin into the bin above said floor; and means for supplying drying air within the bin and below said floor.

16. Apparatus as defined in claim 1 wherein horizontally disposed band members are mounted above said floor to hold granular material at substantially a constant level on said floor.

17. Apparatus as defined in claim 1 wherein horizontally disposed band members are mounted in spaced relation to the upper surface of said floor to hold granular material at substantially a constant level on said floor.

18. Apparatus as defined in claim 1 wherein said floor has an inverted conical shape.

19. The process of drying grain, comprising, depositing a continuous static layer of grain on an inclined supporting surface and increasing the depth of said grain at a plurality of vertically spaced locations along the inclined continuous layer of grain, restraining the downward gravitational movement of the grain in a direction along said inclined supporting surface at the locations of increased depth, holding said grain against gravitational movement, subjecting said grain to the movement of warm air for a period of time to dry said grain sufficiently so that the individual particles of grain will dry and shrink whereupon cohesion among particles of grain will be reduced and the particles of grain will overcome their original static condition and migrate by gravity in a direction towards the lower portion of said inclined supporting surface.

20. The process of claim 19 wherein said warm air is formed through said grain.

References Cited

UNITED STATES PATENTS

| 532,903 | 1/1895 | Pierce | 34—175 |
|---|---|---|---|
| 855,312 | 5/1907 | Higdon | 34—174 |
| 884,696 | 4/1908 | Wilson | 34—79 |
| 1,225,403 | 5/1917 | Borislavsky | 34—79 |
| 2,788,263 | 4/1957 | Engelke | 34—172 XR |
| 2,469,424 | 5/1949 | Wood et al. | 34—171 XR |
| 2,858,620 | 11/1958 | Naylor | 34—174 XR |
| 3,237,315 | 3/1966 | Benecke | 34—174 XR |

KENNETH W. SPRAGUE, Primary Examiner

U.S. Cl. X.R.

34—174

UNITED STATES PATENT OFFICE
CERTIFICATE OF CORRECTION

Patent No. 3,479,748                                  November 25, 1969

Vernon H. Sietmann

It is certified that error appears in the above identified patent and that said Letters Patent are hereby corrected as shown below:

Column 14, line 2, "formed" should read -- forced --.

Signed and sealed this 27th day of October 1970.

(SEAL)
Attest:

Edward M. Fletcher, Jr.                      WILLIAM E. SCHUYLER, JR.
Attesting Officer                              Commissioner of Patents